Dec. 9, 1969     T. E. CHAMBERLAIN     3,482,872
SEAT BELT ASSEMBLY
Filed Feb. 12, 1968     2 Sheets-Sheet 1
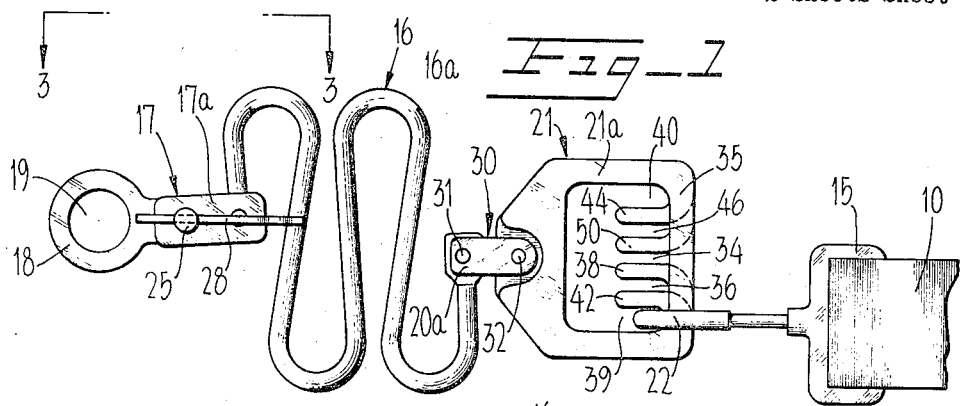
INVENTOR
Thomas E. Chamberlain
BY
Gardner & Zimmerman
ATTORNEYS Dec. 9, 1969   T. E. CHAMBERLAIN   3,482,872
SEAT BELT ASSEMBLY
Filed Feb. 12, 1968   2 Sheets-Sheet 2

INVENTOR
Thomas E. Chamberlain
BY
Gardner & Zimmerman
ATTORNEYS

United States Patent Office 3,482,872
Patented Dec. 9, 1969

3,482,872
SEAT BELT ASSEMBLY
Thomas E. Chamberlain, 475 Juana Ave.,
San Leandro, Calif. 94577
Filed Feb. 12, 1968, Ser. No. 704,617
Int. Cl. B60r 21/10; A62b 35/00; F16d 63/00
U.S. Cl. 297—386                                17 Claims

ABSTRACT OF THE DISCLOSURE

A seat belt assembly for use in automobiles and other vehicles to dissipate or absorb the kinetic energy of an occupant of the vehicle constrained by such seat belt assembly upon collision or other abrupt deceleration of the vehicle. The assembly provides as a feature thereof a selector mechanism for relating the energy-dissipating action of the assembly to the weight of the occupant, and it further provides safety release means for automatically disconnecting the seat belt assembly upon dissipation thereby of kinetic energy in excess of a predetermined magnitude.

Mechanically the seat belt assembly includes a deformable or inelastic energy dissipator structure comprising a plurality of strength-differing dissipators, such as accordion-folded metal bars, disposed between the body-encircling strap of the assembly and the fixed connection thereof with the vehicle. The selector mechanism cooperates with such structure and has a plurality of connector positions therealong respectively corresponding to a plurality of body weights and to which the body-encircling strap is selectively connected to couple the same to one or more of the dissipators generally corresponding in strength to the body weight represented by the selector position. The safety release means comprises pin mechanism connected with the energy dissipator structure so as to be displaced thereby and disconnect the seat belt assembly upon deformation of the dissipator structure to a predetermined extent corresponding to the dissipation thereby of kinetic energy in excess of a predetermined magnitude.

---

This invention relates to a seat belt assembly for automobiles, aircraft and other vehicles; and it relates more particularly to an improved seat belt assembly of the type characterized by at least partially absorbing or dissipating the kinetic energy of an occupant of the vehicle upon abrupt deceleration thereof so as to reduce, within limits, what otherwise would be essentially an impact force transmitted through the seat belt to such occupant of the vehicle upon collision or other abrupt deceleration thereof. The seat belt assembly further provides a selector mechanism for matching in a general sense the energy-dissipating characteristics of the assembly with the weight of the occupant, and it also provides means for automatically releasing the seat belt assembly after kinetic energy in excess of a predetermined magnitude has been dissipated thereby.

With the recent emphasis on safety and protection of the occupants of a vehicle, whether automotive or otherwise, from injury upon collision or other abrupt deceleration thereof, the use of seat belts or safety belts is now quite common. Although it is generally accepted that almost any seat belt is of value in reducing injury in at least certain types of collisions because it secures the occupant to the vehicle and thereby prevents him from becoming an independently propelled projectile, the conventional seat belts presently in use have many disadvantages and limitations, particularly because they do not attenuate the magnitude of the force transmitted thereby to the occupant upon any abrupt deceleration of the vehicle, as upon collision thereof. Accordingly, the occupant of the vehicle, even though constrained by a seat belt, may be subjected to a very large-magnitude, impact-type force which can cause severe injury. Consequently, seat belt structures have been proposed which are intended to dissipate or absorb the high-valued impact forces otherwise imparted to the vehicle occupant upon abrupt deceleration of the vehicle due to collision or other impact-producing accidents.

Such known energy-absorbing seat belt assemblies have several disadvantages including their mechanical complexity, the size or bulk thereof (especially their length since a relatively long length is required to absorb the kinetic energy, as will be described in great detail hereinafter), and their functional unpredictability especially where frictional resistance is used as the energy-absorbing means. Further, such known energy-absorbing seat belt assemblies do not include means for adjusting the energy-absorbing response thereof to the weight of any particular occupant of the vehicle which, evidently, would be especially advantageous in a family automobile in which the weight of an adult passenger can be many orders of magnitude greater than that of a child, who may at some time occupy the same seat. Additionally, such prior seat belt assemblies are not equipped with means for effecting automatic release thereof following absorption of kinetic energy in excess of a predetermined magnitude, which automatic release would be advantageous in that it enables the occupant of the vehicle to remove himself or be removed therefrom quickly following any accident; and which automatic release, it it believed, would stimulate use of the seat belts by alleviating the fear of an occupant of a vehicle that he might be trapped therewithin by the seat belt following an accident of any severity.

In view of the foregoing, objects, among others, of the present invention are to provide an improved seat belt assembly equipped with means for absorbing or dissipating at least a portion of the kinetic energy contained by an occupant of a vehicle constrained by the seat belt assembly, upon collision of other abrupt deceleration of the vehicle, by decelerating the occupant over a predetermined distance independent of the vehicle, it being appreciated that energy constituting the product of force multiplied by distance so that the magnitude of the force opposing a moving body to cause deceleration thereof is inversely proportional to the distance through which the deceleration of such body is permitted to occur; to provide a weight selector mechanism in such improved seat belt assembly so that the energy-dissipating characteristics thereof can be tailored or adjusted to the weight of any particular passenger; and to provide safety release means through which the occupant of the vehicle is released automatically from the constraint of the seat belt assembly following dissipation thereby of kinetic energy in excess of a predetermined magnitude. Additional objects and advantages of the invention especially as concerns particular features and characteristics thereof will become apparent as the specification develops.

Embodiments of the invention are illustrated in the accompanying drawings, in which:

FIGURE 1 is a broken side view in elevation of an improved seat belt assembly embodying the invention;

FIGURE 2 is a broken side view in elevation, largely diagrammatic, illustrating the seat belt assembly in association with a passenger or other occupant of a vehicle seated therein, the position of such occupant following dissipation by the seat belt assembly of kinetic energy in excess of a predetermined magnitude being shown by broken lines;

FIGURE 3 is a broken top plan view taken along the line 3—3 of FIGURE 1 and showing the safety release means;

FIGURE 4 is a side view in elevation of the energy-dissipating structure comprising a part of the seat belt assembly shown in FIGURE 1;

FIGURE 5 is an end view in elevation of the energy-dissipating structure taken along the line 5—5 of FIGURE 4;

Figure 6:
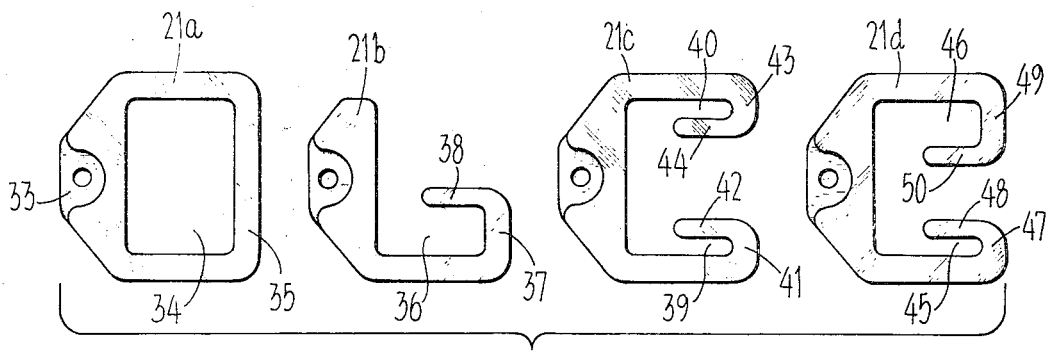
FIGURE 6 is an exploded side view in elevation illustrating the various components of the weight-selector mechanism.

The seat belt assembly illustrated in FIGURE 1 includes the customary belt or strap 10 which usually is substantially inelastic and may be formed of any suitable material which in the ordinary case is a fiber or fabric webbing, a nylon webbing, for example. The belt 10 is drawn about a body portion of an occupant of a vehicle equipped with the seat belt assembly; and in the case of such vehicle being an automobile, as shown in FIGURE 2, the assembly may be a waist-engaging unit as indicated by the numeral 11 or a shoulder harness as denoted with the numeral 12. Dual units including both waist and shoulder assemblies are becoming more usual in automobiles and other passenger vehicles whereas in the past only a waist assembly 11 has been used. A shoulder assembly offers the added advantage of restricting forward bending of the passenger upon a frontal collision or rapid deceleration of the vehicle.

Insofar as respects the present invention, the waist and shoulder assemblies 11 and 12 may be substantially identical, and in each instance the assemblies are anchored to frame or body components of the vehicle 13 and are operative to permit limited forward displacement of the occupant relative to such frame or body components of the vehicle and relative to the seat 14 thereof (assuming the seat to be fixedly anchored to the vehicle so that it is not displaced forwardly relative thereto). As explained in detail hereinafter, such limited forward movement of the occupant affords a distance essentially independent of the vehicle through which his forward momentum or kinetic energy is dissipated upon abrupt or impact deceleration of the vehicle.

The belt 10 is equipped intermediate the ends thereof with the usual releasable buckle or clasp (not shown) that enables the passenger to conveniently and releasably extend the belt and secure it snugly about his appropriate body portion. At each end, the belt 10 is connected with the aforementioned frame or body components of the vehicle 13, and at least at one end it is connected thereto through the assemblage now to be described. It may first be observed, however, that whether such assemblage is used at one or both ends of the belt to connect it with the vehicle will depend upon the particular installation, although the use of two assemblages has the advantages of enabling smaller structures to be employed without any decrease in the distance through which kinetic energy is dissipated and of avoiding the application of torque to an occupant constrained by the belt which could occur should expansion be afforded at only one end. If an assemblage is used only at one end of the belt, the other end thereof will be anchored to the vehicle by any of the conventional arrangements now in use which consist essentially of a coupling secured to the belt and bolted to the frame or body of the vehicle.

Any end of the belt to be secured to the vehicle by such assemblage is equipped with a coupling 15 through which the belt extends and to which it is connectable so that inadvertent relative displacements therebetween along the length of the belt are prevented. The assemblage to which the coupling 15 is attached includes an inelastic kinetic energy dissipator or energy absorbing structure 16 which at one end thereof is connected with a safety release means 17 having an anchor 18 in the form of a closed loop or eye-type fastener provided with an opening 19 therethrough adapted to be fixedly attached to the frame structure of the vehicle 13 as by means of a bolt extending through such opening 19. Adjacent its other end, the energy dissipator structure 16 is connected through fastener means 20 to a weight selector mechanism 21 which is adjustably connected with the coupling 15 through a selector loop 22.

Figure 7:
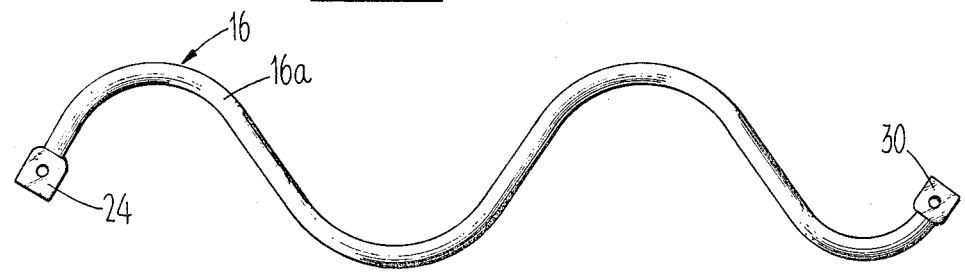
FIGURE 7 is a side view similar to that of FIGURE 4, but showing the energy-dissipating structure in the extended state thereof.

The energy dissipator structure 16 comprises a plurality of individual strength-differing dissipators respectively denoted 16a through 16d which are disposed in side-by-side parallel relation. In the form shown in FIGURES 1 and 3 through 5, the dissipators are metal bars bent into generally serpentine-type folds. Each such individual dissipator 16 is extensible or deformable beyond the elastic limit thereof, as depicted by the elongation of the dissipator 16a illustrated in FIGURE 7, whenever a force of sufficient magnitude is applied thereto adjacent its opposite ends. Such deformation of a dissipator 16 is representative of the performance of work, and as explained further hereinafter, kinetic energy is consumed or dissipated in order that such work be performed. Therefore, upon any sudden or abrupt deceleration of the vehicle 13, the kinetic energy then contained by an occupant thereof is dissipated or used in deforming one or more of the dissipators, whereupon such occupant is decelerated over a predetermined distance proportional to the deformation of the structure 16 with the result that the otherwise damaging effecs of an abrupt or impact deceleration of the occupant, corresponding in distance to that of the vehicle, are alleviated.

The various individual dissipator components 16a through 16d together comprising the kinetic energy dissipator structure 16 may be formed of any material suitable for this purpose, and by way of example a malleable metal such as a relatively soft steel or an aluminum can be used. The force required to deform any one of the dissipators is dependent upon a number of factors including the particular material used to form the same, the cross sectional area thereof, the extent of its malleability, and other factors well known in the field of material mechanics (sometimes referred to as "strength of materials"). Accordingly, the various parameters controlling and determining the function of the structure 16 can be readily correlated with the magnitude of the impact force that the structure is intended to protect against. It will also be noted that the distance through which the occupant of the vehicle is decelerated independently thereof depends upon the length of the structure 16 and the permissible dimensional elongation thereof and can be changed simply by altering the over-all length of the structure. Thus, should a greater energy-dissipating elongation be desired, the structure 16 is simply made longer and more serpentine folds are provided therealong to accommodate such greater length.

As will be described in greater detail subsequently, the various dissipators 16a through 16d have energy-dissipating values or capabilities that may vary one from another or be so ordered and arranged that selected combinations of the dissipators enable the function of the structure 16 to be related to the weight of any particular occupant using the seat belt assembly. By way of example so as to attach illustrative numerical values to the various dissipators, the three dissipators 16a, 16c and 16d may each be intended to accommodate a body weight of 50 pounds and the dissipator 16b a body weight of 100 pounds. Then through the weight selector mechanism 21, as will be described, the structure 16 can be arranged selectively to accommodate changes in body weights in 50 pound increments from about 50 pounds to about 250 pounds.

As shown most clearly in FIGURES 1 and 3, the safety release means 17 comprises a plurality of links respectively denoted with the numerals 17a through 17e alternately disposed with respect to the dissipator bars 16a through 16d and pivotally connected thereto by a pin 23 extending therethrough. In this respect, the links 17a through 17e are relatively thin and flat and have openings therethrough at one end that receive the pin 23; and as shown in FIGURE 4, each of the dissipator bars 16a through 16d has an aperture-equipped flattened end 24 that passes the pin 23 therethrough. Each of the links 17a through 17e is also provided at its other end with an additional opening passing therethrough a connector pin 25 that is freely movable with respect to such openings so that it can be withdrawn therefrom. The connector pin 25 also passes through an opening provided therefor in the anchor 18, and therefore connects such anchor with the links 17a through 17e.

The connector pin 25 is equipped with an enlarged head 26 against which seats one end of a helical compression spring 27 which at its opposite end seats against the outer surface of the link 17e. In the condition illustrated in FIGURE 3, the spring 27 is compressed and therefor imparts a biasing force to the connector pin 25 tending to displace it outwardly from the position shown to withdraw it from the anchor 18 and thereby disengage the anchor from the safety release structure 17 and, therefore, from the kinetic energy dissipator structure 16. The connector pin 25 is maintained in the connection position shown against the biasing force of the spring 27 by a safety release pin 28 attached at one end to the structure 16, and in particular to the bar 16a thereof, and slidably extending through an opening 29 provided therefor in the connector pin 25.

Ordinarily, the kinetic energy dissipator structure 16 is connected by the pin 25 to the anchor 18 and, therefore, to the frame or body components of the vehicle 13; but whenever the safety release pin 28 is withdrawn from the opening 29 in the connector pin 25, the biasing force of the spring 27 displaces the pin 25 outwardly to withdraw it from the anchor 18 and thereby release the safety belt assembly so that the occupant otherwise restrained thereby is free to remove himself or to be removed from the vehicle.

Since the safety release pin 28 is attached to the structure 16, it will be withdrawn from the connector pin 25 only upon deformtion of the structure 16, wherefore the safety belt assembly will be released by the safety release means 17 only following a sudden deceleration of the vehicle of such character that the kinetic energy of the occupant is sufficiently great to cause the requisite deformation of the dissipator structure 16. Further, such release of the safety belt assembly occurs only after the kinetic energy of the occupant has been completely dissipated because prior to that occurrence, the frictional forces developed between the connector pin 25 and the various links 17a through 17e and between the connector pin and the anchor 18 will be so large, as a consequence of the forces applied to these elements during the deceleration of the occupant, that the spring 27 will not have sufficient force to withdraw the connector pin from the links 17 and anchor 18. Thus, the motion of the occupant will have been arrested and the kinetic energy contained thereby dissipated at the time that the seat belt assembly is released.

The energy dissipator structure 16 is connected at its opposite end to the weight selector mechanism 21 through the aforementioned fastener means 20 which, analogously with the safety release structure 17, comprises a plurality of links respectively secured to the dissipator bars 16a through 16d. Thus, there are four such links, one of which is illustrated in FIGURE 1 and is denoted with the numeral 20a. The dissipator bars 16a through 16d have flattened end portions, as shown at 30 in FIGURE 4, and each such flattened end portion 30 has an opening therein alignable with a corresponding opening in the associated link 20 at an end thereof and passing a rivet or other pin 31 therethrough to connect the link with its dissipator bar. Each of the links 20 is also provided at its opposite end with an additional opening passing a rivet or other pin 32 therethrough to connect the link with one of the various components of the weight selector structure 21.

In this respect and as shown in FIGURE 6, the selector structure 21 comprises a plurality of individual loops or laminations respectively denoted with the numerals 21a through 21d. Each of the loops 21a through 21d has an aperture equipped flattened area 33 at one location therealong receiving the associated link 20 and the pin 32 connecting the link thereto. Evidently, then, there are four individual selector loops 21a through 21d respectively connected to the four individual dissipator bars 16a through 16d by the four individual fastener links 20 respectively associated therewith.

The selector loops differ from each other in shape, and the loop 21a is closed to refine a large opening or perimetrically closed space 34 having a force applicator bar 35 bordering such space along the forward edge thereof. The loop 21b is somewhat J-shaped and defines a partially open space 36 along the forward edge of which is a force applicator bar 37 terminating in an inwardly projecting tongue or separator 38. The loop 21c is generally symmetrical about a center line therethrough, and it provides a double J-shaped configuration forming perimetrically open spaces 39 and 40, the first of which has a force applicator bar 41 along the forward edge thereof which terminates in an inwardly projecting tongue or separator 42, and the second of which has a force applicator bar 43 along its forward edge terminating in an inwardly projecting tongue or separator 44. The loop 21d also has a double J-shaped configuration, but is asymmetrical about a center line therethrough to provide a perimetrically open space 45 which is somewhat smaller than the other perimetrically open space 46. The space 45 is provided along the forward edge thereof with a force applicator bar 47 terminating in an inwardly projecting tongue or separator 48, and the space 46 is provided along its forward edge with a force applicator bar 49 terminating in an inwardly projecting tongue or separator 50.

When the selector loops 21a through 21d are assembled in side-by-side juxtaposition as shown in FIGURE 1, the tongues or separators respectively provided by the loops 21b through 21d project inwardly into the large open space 34 provided by the loop 21a and thereby define a plurality of individual selector positions along the force applicator bar 35 and separated from each other by the various tongues. These selector positions essentially correspond to the spaces 34, 36, 40, 39, 45 and 46 respectively provided by the selector loops and thereby determine which loops are made effective by positioning the adjustable connector loop or member 22 in such selector positions.

More particularly, it will be apparent by comparing FIGURES 1 and 6 that if the adjustable connector 22 is interposed between the tongues 38 and 50, it will be effectively disposed within the space 34 defined by the selector loop 21a and engages only the force applicator bar 35. Accordingly, only the dissipator bar 16a connected by the link 20a with the selector loop 21a will be operative to dissipate the kinetic energy of a vehicle occupant constrained by the seat belt assembly. In an analogous manner, if the adjustable connector member 22 is interposed between the tongues 38 and 42 (the tongue 48 of the selector loop 21d being located at the same elevation as the tongue 42 and being concealed thereby in FIGURE 1), it is effectively located within the space 36 defined by the selector loop 21b, wherefore the member 22 will engage the two force applicator bars 35 and 37 so that the two dissipator bars 16a and 16b respectively associated with the selector loops 21a and 21b will become operative to dissipate the kinetic energy of such occupant.

Positioning the adjustable connector member 22 intermediate the tongues 44 and 50 will effectively locate it within the space 46 provided by the selector bar 21d with the result that the member 22 will bear against both of the force applicator bars 35 and 49, wherefore the two selector loops 21a and 21d and the two dissipator bars 16a and 16d respectively associated therewith will be operative to dissipate the kinetic energy of a vehicle occupant constrained by the seat belt assembly. If the adjustable member 22 is shifted to a position above the tongue 44, it will bear against the force applicator bars 35, 43 and 49, and the three dissipator bars respectively associated with the selector loops 21a, 21c and 21d will then be effective in dissipating the kinetic energy of a vehicle occupant. Finally, if the adjustable member 22 is disposed in the fifth selector position as illustrated in FIGURE 1, it will bear against all of the force applicator bars 35, 37, 41 and 47 so that all of the dissipator bars 16a through 16d will be operative to dissipate the kinetic energy of a vehicle occupant constrained by the seat belt assembly upon collision or abrupt deceleration of the vehicle.

Referring to the weight range indicated hereinbefore for illustrative purposes, if the vehicle occupant constrained by the seat belt assembly has a weight of the order of 50 pounds or less, the adjustable connector member 22 is most appropriately disposed intermediate the tongues 38 and 50 in which selector position only the dissipator bar 16a is operative. If the weight of the occupant is of the general order of 100 pounds, then the adjustable member 22 may be located in the selector position intermediate the tongues 38 and 42, in which event the two dissipator bars respectively associated with the selector loops 21a and 21b become operative. Analogously, if the weight of the occupant is of the general order of 150 pounds, the adjustable member 22 is most appropriately located in the selector position defined between the tongues 44 and 50; if his weight approximates 200 pounds the adjustable member 22 is best disposed at the position above the tongue 44; and if the occupant's weight approximates or exceeds 250 pounds, the selector position below the tongue 42 can be adopted as shown in FIGURE 1, in which event all of the dissipator bars 16a through 16d become effective to dissipate the kinetic energy of the occupant. It will be understood that the weights and general range indicated are illustrative only and, as explained heretofore, the dissipator bars 16a through 16d may be constructed so as to dissipate kinetic energy of any desired magnitude.

In this respect, it is well known that the kinetic energy of a body is defined by the expression $$\text{kinetic energy} = \tfrac{1}{2} MV^2$$

where M is equal to the mass of the object (in this case an occupant of the vehicle) containing the energy, or the weight thereof divided by gravitational acceleration (32 feet per second$^2$), and V is equal to the velocity of the object or occupant in feet per second. By dissipating kinetic energy through a relatively great distance, the tremendously destructive capability of large valued kinetic energy inherent in any abrupt or impact-type expenditure thereof is obviated. As an illustration, the difference in result between a vehicle being braked to a stop from a high speed through a great distance and being abruptly stopped or decelerated by impact with an immovable obstruction need only be considered. Thus, by decelerating a vehicle occupant through the relative great distance defined by elongation of one or more of the dissipator bars 16a through 16d, the occupant is protected against the injury he might otherwise be subjected to.

The energy dissipation defined by inelastic deformation of the dissipator bars 16a through 16d is positive and reliable because it is inherent in the design construction thereof. The dissipation characteristics are readily changed to fit the requirements of any particular environment by altering such design construction in accordance therewith. Further, the distance through which the kinetic energy of a passenger can be dissipated can be increased or decreased to fit the requirements or limitations of any installation by lengthening or shortening the dissipator bars—keeping in mind, however, that the greater the distance through which the kinetic energy is dissipated, the greater the protection to the occupant being constrained by the seat belt assembly. Further concerning the occupant's safety, it will be noted that the release pin 28 is fixedly attached to the dissipator bar 16a and that such bar is always operative because in each of the five possible selector positions of the adjustable connector member 22, it bears against the force applicator bar 35 of the selector loop 21a to which the dissipator bar 16a is connected. Accordingly, following any abrupt deceleration of the vehicle in which the kinetic energy contained by the occupant thereof is sufficient to elongate the dissipator bar 16a, the release pin will be withdrawn from the opening 29 in the connector pin 25 so that the seat belt assembly will be released to free the occupant following any such abrupt deceleration of the vehicle.

Figure 8:
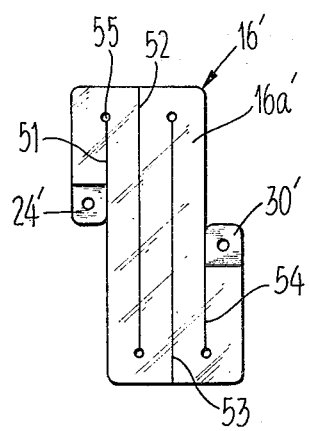
FIGURE 8 is a side view in elevation of a modified energy-dissipating structure.

A slightly modified energy dissipator structure is illustrated in FIGURE 8, and since it is substantially similar to the dissipator structure 16 heretofore described, the primed form of the same numerals are used to designate respectively corresponding components. Thus, the modified structure 16' includes a plurality of individual dissipators, one of which is illustrated in FIGURE 8 and is denoted as 16a'. The dissipators have flattened end portions 24' and 30' so as to permit the same to be connected to the aforementioned links 17 and 20. Each dissipator 16' comprises a longitudinally extending metal plate provided with a plurality of transversely oriented cuts alternately extending into the plate from opposite edges thereof. In the particular dissipator 16a' illustrated, there are four such cuts or lines of severance respectively designated with the numerals 51, 52, 53 and 54. At their inner terminii, the cuts have rounded or generally circular enlargements, as shown at 55, so as to relieve stresses thereat.

When a force of sufficient magnitude is applied to the dissipator 16a' adjacent the flattened end portions 24' and 30' thereof, the dissipator elongates by deforming or bending inelastically generally adjacent the locations of the enlargements 55. Thus, the individual dissipators in the structure 16' function in essentially the same manner as the individual dissipators in the structure 16 heretofore described, but may occupy a little less space initially because the various folds of the individual dissipators are in substantially contiguous relation, as shown in FIGURE 8.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. In a seat belt assembly for an occupant of a vehicle or the like, kinetic energy dissipator structure deformable upon application thereto of kinetic energy in excess of a predetermined magnitude so as to cause at least partial dissipation thereof as it effects such deformation, weight selector mechanism having a plurality of connector positions thereon respectively corresponding in a general order of magnitude to various weights of different occupants, and an adjustable connector member provided by said seat belt structure for selective connection with said weight selector mechanism at such connector positions thereof to condition said seat belt assembly in general correspondence to the weight of any such occupant to be constrained thereby.

2. The seat belt assembly of claim 1 in which said kinetic energy dissipator structure comprises a plurality of individual energy dissipators, and in which various energy dissipators and combinations thereof are made operative selectively by connection of said connector member at one or another of the connector positions provided by said weight selector mechanism.

3. The seat belt assembly of claim 2 in which each of said energy dissipators comprises a plurality of successive accordion-type folds and is longitudinally elongated upon application thereto of kinetic energy in excess of such predetermined magnitude.

4. The seat belt assembly of claim 3 in which each of said energy dissipators is a metal bar folded upon itself in a serpentine fashion.

5. The seat belt structure of claim 3 in which each of said energy dissipators is a longitudinally extending metal plate provided with a plurality of transversely oriented cuts alternately extending thereinto from opposite edges thereof to define the aforesaid accordion-type folds.

6. The seat belt assembly of claim 5 in which each of said plates is provided with a plurality of arcuate openings therethrough respectively disposed adjacent the inner termini of said cuts so as to minimize a tendency toward tearing thereat upon such longitudinal elongation of the plate when kinetic energy in excess of such predetermined magnitude is applied thereto.

7. The seat belt assembly of claim 2 in which said weight selector mechanism comprises a plurality of selector loops respectively secured to said individual energy dissipators, said adjustable connector member being connected to various selector loops and combinations thereof by connection with said weight selector mechanism at one or another of the connector positions thereof to effect the aforesaid selective connection with said individual energy dissipators.

8. The seat belt assembly of claim 7 in which each of said selector loops is provided with a force applicator connector bar cooperable with said adjustable connector member, and in which at least certain of said selector loops have separator tongues extending inwardly from their force applicator bars to separate said connector positions from each other.

9. In a seat belt assembly for an occupant of a vehicle or the like, kinetic energy dissipator structure deformable upon application thereto of kinetic energy in excess of a predetermined magnitude so as to cause at least partial dissipation thereof as it effects such deformation, and safety release means located along said seat belt assembly and operative to release the constraint imposed thereby on such occupant to free him therefrom upon such predetermined deformation of said energy dissipator structure.

10. The seat belt assembly of claim 9 in which said safety release means includes a release pin connected with said energy dissipator structure so as to be displaced thereby from its operative position by such deformation thereof to so release said seat belt assembly.

11. The seat belt assembly of claim 10 and further comprising anchor structure for connecting the assembly to such vehicle, and in which said safety release structure further comprises a connector pin extending through said energy dissipator and anchor structure for interconnecting the same and being spring biased toward a direction effecting disconnection thereof, said connector pin being retained by said release pin against such spring bias until the aforesaid displacement of said release pin.

12. The seat belt assembly of claim 9 and further comprising weight selector mechanism having a plurality of connector positions thereon respectively corresponding in a general order of magnitude to various weights of different occupants, and an adjustable connector member provided by said seat belt structure for selective connection with said weight selector mechanism at such connector positions thereof to condition said seat belt assembly in general correspondence to the weight of any such occupant to be constrained thereby.

13. The seat belt assembly of claim 12 in which said kinetic energy dissipator structure comprises a plurality of individual energy dissipators, and in which various energy dissipators and combinations thereof are made operative selectively by connection of said connector member at one or another of the connector positions provided by said weight selector mechanism.

14. The seat belt assembly of claim 13 in which said weight selector mechanism comprises a plurality of selector loops respectively secured to said individual energy dissipators, said adjustable connector member being connected to various selector loops and combinations thereof by connection with said weight selector mechanism at one or another of the connector positions thereof to effect the aforesaid selective connection with said individual energy dissipators.

15. The seat belt assembly of claim 14 in which each of said selector loops is provided with a force applicator bar cooperable with said adjustable connector member, and in which at least certain of said selector loops have separator tongues extending inwardly from their force applicator bars to separate said connector positions from each other.

16. The seat belt assembly of claim 15 in which said safety release means includes a release pin connected with one of said individual energy dissipators so as to be displaced thereby from its operative position by such deformation of said energy dissipator structure to so release said seat belt assembly.

17. The seat belt assembly of claim 16 and further comprising anchor structure for connecting the assembly to such vehicle, and in which said safety release structure further comprises a connector pin extending through each of said individual energy dissipators and said anchor structure for interconnecting the same and being spring biased toward a direction effecting disconnection thereof, said connector pin being retained by said release pin against such spring bias until the aforesaid displacement of said release pin.

References Cited
UNITED STATES PATENTS

| | | | |
|---|---|---|---|
| 3,089,564 | 5/1963 | Smittle | 297—386 X |
| 3,106,989 | 10/1963 | Fuchs | 297—386 X |
| 3,126,072 | 3/1964 | Johansson | 297—386 |
| 3,280,942 | 10/1966 | Millington | 297—386 |
| 3,361,475 | 1/1968 | Villiers | 297—386 |

JAMES T. McCALL, Primary Examiner

U.S. Cl. X.R.

188—1